(12) United States Patent
Futakuchi et al.

(10) Patent No.: US 7,957,232 B2
(45) Date of Patent: Jun. 7, 2011

(54) GAP CONTROLLER AND OPTICAL INFORMATION PROCESSOR

(75) Inventors: Ryutaro Futakuchi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/270,254

(22) Filed: Nov. 13, 2008

(65) Prior Publication Data

US 2009/0129240 A1    May 21, 2009

(30) Foreign Application Priority Data

Nov. 21, 2007   (JP) .................................. 2007-301737

(51) Int. Cl.
*G11B 7/004*   (2006.01)
(52) U.S. Cl. ............... 369/44.25; 369/112.23; 369/13.33
(58) Field of Classification Search ............... 369/44.25, 369/112.23, 13.33
See application file for complete search history.

(56) References Cited

U.S. PATENT DOCUMENTS

| | | | |
|---|---|---|---|
| 6,180,201 B1 * | 1/2001 | Sandstrom | 428/64.1 |
| 6,243,350 B1 * | 6/2001 | Knight et al. | 369/126 |
| 6,285,484 B1 * | 9/2001 | Takishima et al. | 359/198.1 |
| 6,349,083 B1 * | 2/2002 | Kiriki et al. | 369/112.23 |
| 6,487,148 B1 * | 11/2002 | Hsieh | 369/47.1 |
| 6,496,468 B2 | 12/2002 | Hajjar et al. | |
| 2002/0054561 A1 * | 5/2002 | Inase et al. | 369/275.3 |
| 2007/0286031 A1 * | 12/2007 | Matsumoto | 369/13.13 |
| 2009/0154309 A1 * | 6/2009 | Jeong et al. | 369/44.32 |

FOREIGN PATENT DOCUMENTS

JP    2002-319160    10/2002

* cited by examiner

*Primary Examiner* — Wayne R Young
*Assistant Examiner* — Thomas D Alunkal
(74) *Attorney, Agent, or Firm* — Renner, Otto, Boisselle & Sklar, LLP

(57) ABSTRACT

A gap controller according to the present invention can set a reference level reasonably for a gap control that needs to be done to keep the gap between a solid immersion lens (SIL) and an optical disc constant. With the gap varied at a substantially regular step, gap detection signal levels are logged to find an extreme value of its second-order difference. And the gap control reference level is determined by the gap detection signal level that results in that extreme value.

6 Claims, 6 Drawing Sheets

GAP CONTROLLER AND OPTICAL INFORMATION PROCESSOR

BACKGROUND OF THE INVENTION

1. Field of the Invention

The present invention relates to a gap controller for keeping constant the gap between a solid immersion lens (SIL) for producing near-field light and an optical information storage medium that has been loaded into an optical information processor to read and/or write a signal from/on the storage medium using the near-field light. The present invention also relates to an optical information processor including such a gap controller and to a method for driving the optical information processor.

2. Description of the Related Art

A technique for further increasing the data storage density of an optical disc by using an SIL and near-field light has been proposed. A typical SIL is a high-refractive-index lens, of which the shape is defined by cutting out a portion of a spherical lens. An SIL is inserted between a condenser lens and an optical disc to produce near-field light at the bottom.

To read and write data from/on an optical disc, which is an exemplary optical information storage medium, using an SIL, the SIL and the side of the optical disc (which will be referred to herein as a "signal read/write side") needs to be so close to each other that the near-field light can reach the signal read/write side of the optical disc. In addition, by performing a so-called "gap control" to keep the gap between the SIL and the optical disc surface constant, the light beam spot on either the disk surface or the information storage layer should maintain a predetermined size.

A read/write operation using an SIL is disclosed in detail in U.S. Pat. No. 6,496,468, the entire disclosure of which is hereby incorporated by reference.

Such a gap control is carried out by taking advantage of the property that the intensity of the light returning from an SIL changes its levels according to the magnitude of the gap between the SIL and the given optical disc. Japanese Patent Application Laid-Open Publication No. 2002-319160 discloses an exemplary optical information processor that performs such a gap control. Specifically, such a gap control is carried out by comparing a voltage converted from the intensity level of the light returning from the SIL to a reference voltage representing a desired gap and by getting the SIL driven by an actuator such that the difference between these two values becomes as small as possible. The magnitude of the gap can be varied by changing the reference voltages.

To produce near-field light between the SIL and the signal read/write side of the given optical disc, the gap between them should be adjusted to an extremely small value of 20 nm, for example. And such a target gap value should remain the same even if the reflectance of the given optical disc has changed.

If the two given optical discs have mutually different reflectances, however, their gap-returning light intensity level characteristics are also different from each other as shown in FIGS. 4 and 5. In this case, FIG. 4 is a graph showing the relation between the gap and the returning light intensity level in an optical disc with a reflectance of 10%, while FIG. 5 is a graph showing the relation between the gap and the returning light intensity level in an optical disc with a reflectance of 25%. In both of FIGS. 4 and 5, the abscissa represents the gap (nm) and the ordinate represents the returning light intensity level, which is shown as a ratio when the returning light intensity level associated with an infinite gap is supposed to be one. That is why the returning light intensity level when the magnitude of the gap is equal to zero represents the reflectance itself.

If the given optical disc has the characteristic shown in FIG. 4, the gap control should be carried out with the gap control reference level defined to be 0.27 in order to maintain the gap at 20 nm as described above. On the other hand, if the given optical disc has the characteristic shown in FIG. 5, the gap control reference level should be 0.39 to maintain the same gap.

As is clear from this fact, to carry out a gap control on various optical discs with mutually different reflectances such that the gap value remains the same, the gap control reference levels should be redefined appropriately. That is to say, when an optical disc from/on which data is going to be read or written is loaded into an optical disc drive, a returning light intensity level associated with the desired gap needs to be known in advance. For that purpose, an optical information processor such as an optical disc drive would normally need to include both 1. means for measuring the returning light intensity level, and
2. means for measuring the gap accurately.

The returning light intensity level can be measured with a photoelectric transducer, for example. However, since the desired gap has an extremely small value of about 20 nm, it is difficult in the current state of the art to realize means for setting such a small gap exactly and build such means in an optical information processor. Also, even if such means for setting the gap exactly were realized, that means would be a rather bulky device. That is why it is far from being realistic or beneficial to introduce such a bulky device into an optical disc drive as a consumer electronic product.

In order to overcome the problems described above, the present invention has an object of providing a gap controller that realizes the desired gap even if the given optical information storage medium has a different reflectance from the previous one.

Another object of the present invention is to provide an optical information processor including such a gap controller.

SUMMARY OF THE INVENTION

A gap controller according to the present invention is designed for use in an optical information processor with an optical system that includes a solid immersion lens and that produces near-field light to be incident on an optical information storage medium. The controller includes: a moving section for moving at least one of the solid immersion lens and the optical information storage medium so as to vary the gap between the solid immersion lens and the optical information storage medium; a gap detecting section for outputting a gap detection signal representing the magnitude of the gap between the solid immersion lens and the optical information storage medium; a gap control system for controlling the position of the solid immersion lens such that the level of the gap detection signal is maintained at a reference level Vref; and second-order difference calculating means for calculating the second-order difference of the gap detection signal with respect to the gap by getting the gap varied by the moving section and by getting the levels of the gap detection signal that change with the varying gap. The gap control system determines the reference level Vref based on the second-order difference.

In one preferred embodiment, the gap control system determines the reference level Vref based on the level of the gap detection signal when the second-order difference has an extreme value.

In this particular preferred embodiment, the reference level Vref is determined by Vref=V−C×(Vf−V), where V is a level of the gap detection signal when the second-order difference has the extreme value, Vf is a level of the gap detection signal when the gap corresponds to a sufficiently large value, and C is a constant of proportionality.

An optical information processor according to the present invention includes: an optical system that includes a solid immersion lens and that produces near-field light to be incident on an optical information storage medium; a moving section for moving at least one of the solid immersion lens and the optical information storage medium so as to vary the gap between the solid immersion lens and the optical information storage medium; a gap detecting section for outputting a gap detection signal representing the magnitude of the gap between the solid immersion lens and the optical information storage medium; a gap control system for controlling the position of the solid immersion lens such that the level of the gap detection signal is maintained at a reference level Vref; and second-order difference calculating means for calculating the second-order difference of the gap detection signal with respect to the gap by getting the gap varied by the moving section and by getting the levels of the gap detection signal that change with the varying gap. The gap control system determines the reference level Vref based on the second-order difference.

A driving method according to the present invention is a method for driving an optical information processor with an optical system that includes a solid immersion lens and that produces near-field light to be incident on an optical information storage medium. The method includes the steps of: varying the gap between the solid immersion lens and the optical information storage medium, thereby generating a gap detection signal that changes its levels with the varying gap; calculating the second-order difference of the gap detection signal with respect to the gap; determining a reference level Vref based on the second-order difference; and controlling the position of the solid immersion lens such that the level of the gap detection signal is maintained at the reference level Vref.

In one preferred embodiment, the step of determining the reference level Vref includes determining the reference level Vref based on the level of the gap detection signal when the second-order difference has an extreme value.

A gap controller according to the present invention can determine the gap control reference level Vref without accurately measuring the gap between the SIL and the optical information storage medium. That is why the gap control reference level can be found with a simple device configuration. In addition, even if the given optical information storage medium has a different reflectance from the previous one and exhibits a different gap-reflected light intensity level characteristic, the gap control reference level to realize the desired gap can be determined easily.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 4:
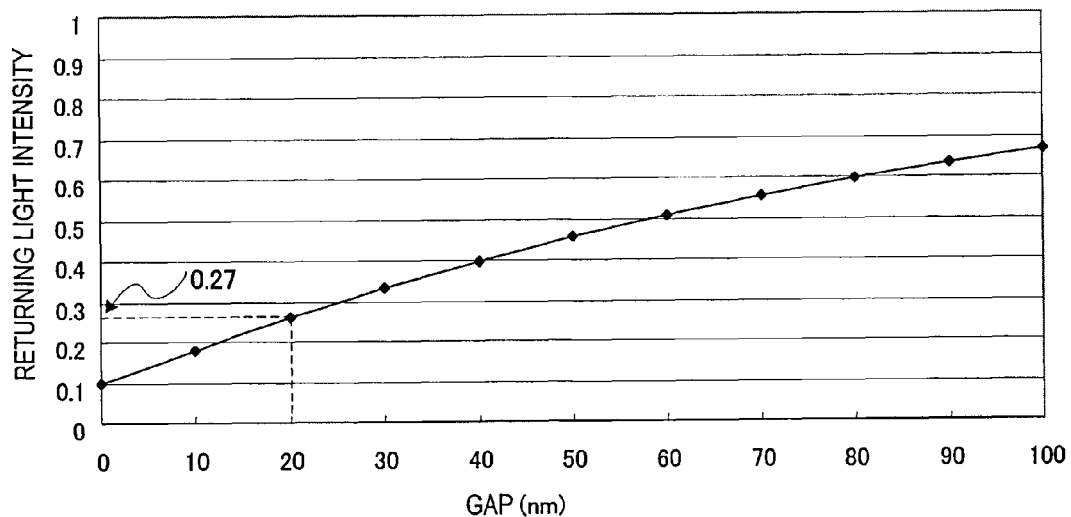
FIG. 4 is a graph showing a gap detection characteristic in a situation where the reflectance is 10%.
Figure 5:
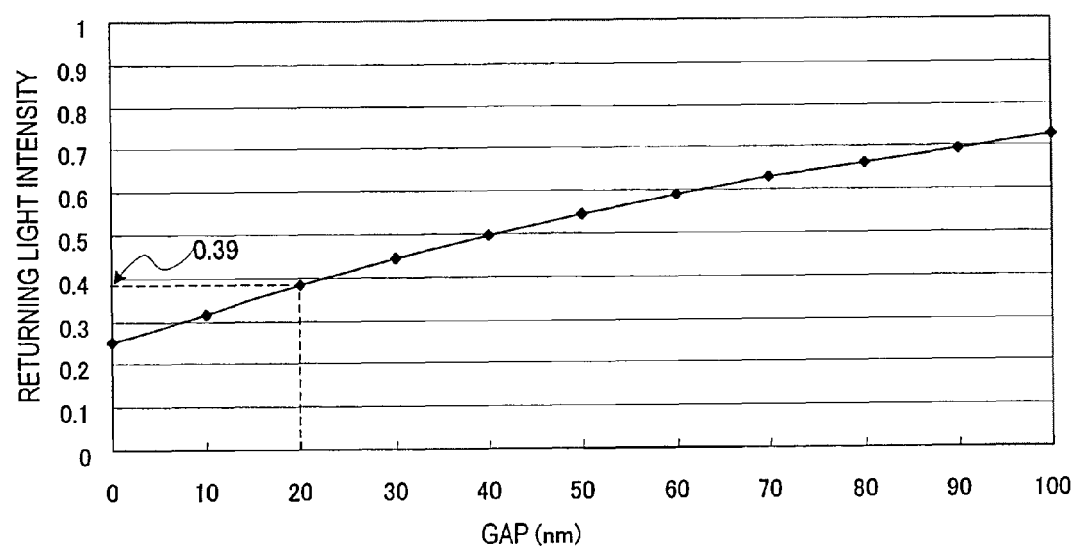
FIG. 5 is a graph showing a gap detection characteristic in a situation where the reflectance is 25%.

The present inventors carried out an in-depth analysis on the gap dependence of the returning light intensity level as shown in FIGS. 4 and 5. As a result, the present inventors discovered that the curve representing the gap dependence of the returning light intensity level had a point at which the rate of variation of the gradient had an extreme value (i.e., a point at which the second-order differentiation of the curve had an extreme value) and that the gap associated with that extreme value did not depend on the reflectance of the optical disc. In both of the curves shown in FIGS. 4 and 5, for example, the gradient changes significantly when the gap is in the vicinity of approximately 30 nm. This phenomenon would be produced by a property of the near-field light but it is still not clear exactly how and why that phenomenon occurred. The present inventors also discovered that in every curve representing the gap dependence of the returning light intensity level, the intersection between the extension of a tangential line in the vicinity of a point on the curve, of which the second-order differential value became an extreme value, and a line parallel to the axis of abscissas where the returning light intensity level was one in the graphs shown in FIGS. 4 and 5 did not depend on the reflectance of the optical disc. Taking these results into consideration, it should be possible to calculate arithmetically, based on the returning light intensity level at a point where the second-order differential value becomes an extreme value, a returning light intensity level associated with an arbitrary gap in the vicinity of that extreme value. A specific method of calculation will be described later.

In the curve representing the gap dependence of the returning light intensity level, such a point where the second-order differential value becomes an extreme value can be easily located by measuring the returning light intensity levels with the gaps changed at fine and regular intervals and by calculating the second-order differences. In the example illustrated in FIG. 4, the returning light intensity levels may be measured with the gap shortened at regular intervals (of several nm, for example) from a value that is sufficiently greater than 30 nm and their second-order differences may be calculated. The absolute value of such a second-order difference increases as the gap decreases, reaches an extreme value in the vicinity of 30 nm, and then starts to decrease. Once the returning light intensity level associated with a gap when the second-order difference has an extreme value has been found, the returning light intensity level associated with a gap of 20 nm, for example, may be calculated, even if the exact value of the gap is still unknown. Consequently, (the control target value or reference value of) the returning light intensity level that should be obtained when the target gap is realized can be determined relatively easily without measuring the gap accurately.

Hereinafter, preferred embodiments of a gap controller according to the present invention will be described with reference to the accompanying drawings.

Figure 1:
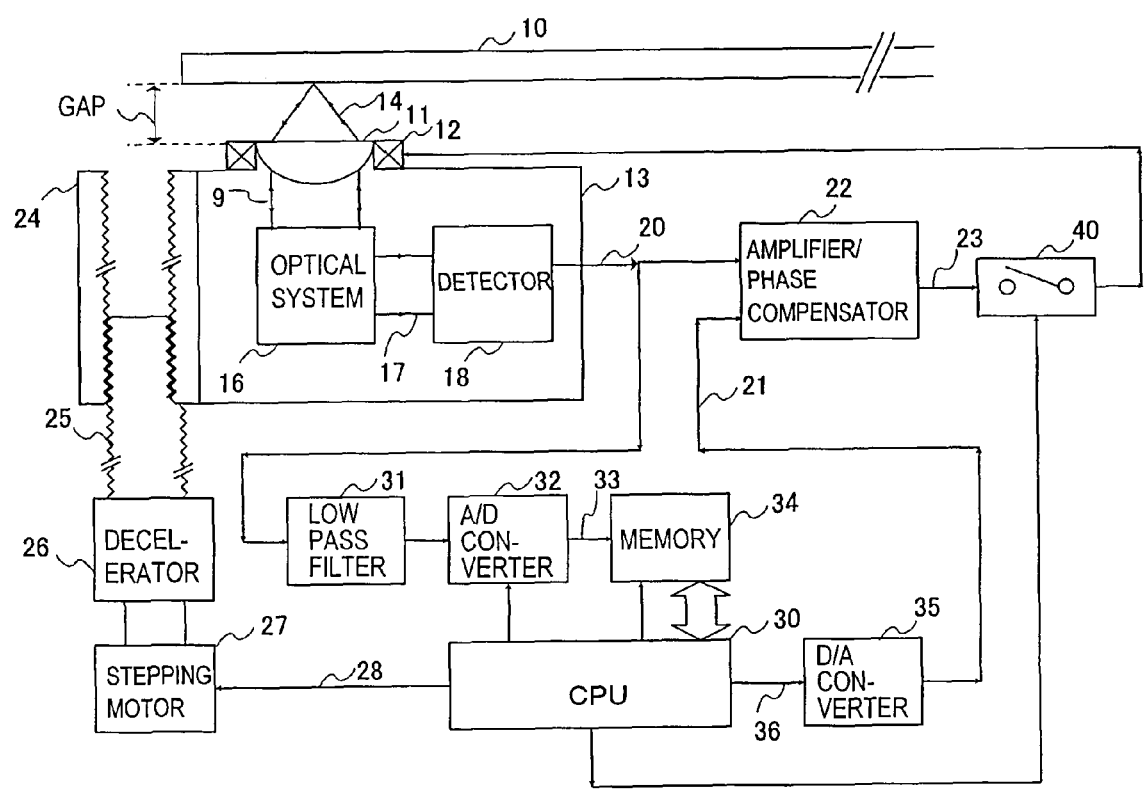
FIG. 1 is a block diagram illustrating a configuration an optical information processor as a preferred embodiment of the present invention.

First, look at FIG. 1, which is a block diagram illustrating, as a preferred embodiment of the present invention, the configuration of an optical information processor including the gap controller of the present invention.

An optical information processor according to this preferred embodiment is implemented as an optical disc drive including an optical system that produces near-field light using an SIL 11. The optical disc drive can read and write data from/on an optical disc 10, which is an exemplary optical information storage medium, at high densities. Specifically, this optical disc drive includes an optical pickup 13 for optically accessing the optical disc 10. The optical pickup 13 includes an optical system 16 for emitting a light beam 14 toward a target address location on the optical disc 10 through the SIL 11 and detecting and processing the light reflected from the optical disc 10, and also includes a detector 18. The optical pickup 13 can be displaced parallel to the surface of the optical disc 10 (i.e., in the radial direction) by a traverse mechanism (not shown) and can access any desired location in the radial direction on the optical disc 10.

The optical information processor of this preferred embodiment further includes a motor (not shown) for rotating the optical disc 10, which is an exemplary disklike optical information storage medium. This optical disc drive may be a player that can only read data or a recorder/player that can both read and write data. However, an optical information processor according to the present invention does not have to be such an optical disc drive but may also be a device for reading and writing data from/on a non-rotating card type optical information storage medium.

The optical pickup 13 includes an actuator 12 for displacing the SIL 11. Thanks to the action of the actuator 12, the SIL 11 can move at least perpendicularly to the housing or the base portion of the optical pickup 13.

In this preferred embodiment, the actuator 12 has a mechanism that holds a lens holder (not shown) with an elastic member such as a spring and that moves the lens holder to a degree corresponding to the magnitude of the drive current. In FIG. 1, only the SIL 11 is fitted into the lens holder. However, any other lens (such as a condenser lens) may also be fitted along with the SIL 11. In this preferred embodiment, the drive current that has been supplied to the actuator 12 flows through a coil in the actuator 12, thereby generating a magnetic field. And on receiving magnetic force from this magnetic field, the lens holder moves. When the magnitude of the drive current is equal to zero, the lens holder remains at its rest position (i.e., in mechanically equilibrium state) without resisting the elastic force applied by the spring. As the magnitude of the drive current increases, however, the lens holder can move increasingly by overcoming the elastic force. Naturally, the configuration of the actuator 12 is never limited to the illustrated one.

When the SIL 11 is sufficiently distant from the optical disc 10, the light beam 14 is totally reflected from the end face of the SIL 11 that is opposed to the optical disc. In this case, the intensity of the light returning from the SIL 11 is constant irrespective of the magnitude of the gap between the SIL 11 and the optical disc 10.

The light beam 14 shown in FIG. 1 actually includes light going toward (i.e., irradiating) the optical disc 10 and light coming back (i.e., reflected) from the optical disc 10. These rays of light that are going toward, and coming back from, the optical disc 10 are coupled together to produce a light beam 9. And the light beams 9 and 14 are optically processed by the optical system 16 of the optical pickup 13. The optical system 16 includes a light source such as a semiconductor laser diode and an optical element such as a beam splitter, and separates a light beam 17 from the light beam 9 that has been reflected from the optical disc 10 and then makes the light beam 17 incident on the detector 18. The light beam 17 includes the light beam that has been reflected from the optical disc 10 and the light returning from the SIL 11.

As the intensity of the light beam 17 has something to do with the gap between the SIL 11 and the optical disc 10, the output electrical signal 20 that has been subjected to a photoelectric conversion by the detector 18 will be referred to herein as a "gap detection signal". The gap detection signal 20 includes an AC component and a DC component, which derives from the light returning from the SIL 11. That is why the DC level of the gap detection signal 20 will be referred to herein as a "gap detection signal level".

Between the gap and the gap detection signal level, there is the relation shown in FIG. 4 or 5 as described above. That is why the detector 18 can function as a "gap detecting section" for outputting a gap detection signal 20 representing the magnitude of the gap.

The AC component of the gap detection signal 20 represents an RF signal that has been read from the optical disc 10. If the detector 18 is divided into a number of areas and if the output electrical signals of those areas are processed, then a tracking error signal can also be obtained. In this manner, the detector 18 does not function just as a gap detecting section.

The gap detection signal 20 is input, along with a reference voltage 21 to be described later, to an amplifier/phase compensator 22, where the difference between the gap detection signal 20 and the reference voltage 21 is amplified and then subjected to an appropriate phase compensation, thereby generating gap control current 23. The gap control current 23 that has been generated by the amplifier/phase compensator 22 is then supplied to the actuator 12 by way of a loop switch 40, the ON/OFF states of which are controlled by a CPU 30.

The reference voltage 21 is defined so as to be equal to the DC level of the gap detection signal 20 corresponding to a desired gap value (i.e., the gap detection signal level). In this description, the level of the reference voltage 21 that has been defined in this manner will sometimes be referred to herein as a "reference level Vref". If the switch 40 is closed when the reference voltage 21 with the reference level Vref is given to the amplifier/phase compensator 22, a gap control for maintaining the magnitude of the gap at a desired one can be carried out. That is to say, the amplifier/phase compensator 22 constitutes a gap control system for controlling the position of the SIL 11 such that the gap detection signal level is kept equal to the reference level Vref.

The optical information processor of this preferred embodiment includes a nut 24 that forms an integral part of the optical pickup 13. This nut 24 engages with the feed screw 25 of the optical information processor. In this preferred embodiment, both the feed screw 25 and the nut 24 have a pitch of 0.1 mm. When the feed screw 25 makes one turn, the SIL 11, along with the optical pickup 13, either comes closer toward, or goes away from, the optical disc 10 depending on the direction of rotation of the feed screw 25. That is to say, by turning the feed screw 25, the gap can be varied. This feed screw 25 is coupled to a decelerator 26 with an axle ratio of 1/20,000. As the decelerator 26 is driven by a stepping motor 27, the gap can be varied by 5 nm every time the stepping motor 27 makes one turn. The operation of the stepping motor 27 is controlled responsive to a rotation instruction pulse 28 supplied from the CPU 30. Thus, according to this preferred embodiment, the nut 24, the feed screw 25, the decelerator 26, and the stepping motor 27 together form a moving section for varying the gap.

The gap detection signal 20 is output from the detector 18 to a low pass filter 31, which removes AC components from the gap detection signal 20. As a result, the DC level of the gap detection signal 20 (which will be referred to herein as a "gap detection signal level") is supplied to an A/D converter 32 from the low pass filter 31. The A/D converter 32 is controlled by the CPU 30 and converts the gap detection signal, which is analog data, into gap detection signal level data 33, which is digital data. The gap detection signal level data 33 is stored in a memory 34, which is also controlled by the CPU 30.

The low pass filter 31, the A/D converter 32, the memory 34 and the CPU's function of controlling the A/D converter 32 and the memory 34 together form data logging means for logging the DC level of the gap detection signal 20 as data.

In this preferred embodiment, every time the CPU 30 applies a rotation pulse 28 to the stepping motor 27 to have the motor 27 make one turn, the gap varies by 5 nm. Thus, if the stepping motor 27 receives multiple rotation pulses 28 from the CPU 30 consecutively, then the gap will vary stepwise on a 5 nm basis. And every time the gap varies stepwise, the gap detection signal level data 33 representing each of those gap values gets stored in the memory 34. In this manner, according to this preferred embodiment, gap detection signal level data 33 representing multiple different gap values are sequentially logged, and a group of gap detection signal level data is stored in the memory 34 as a result.

The CPU 30 has the function of finding a gap detection signal level corresponding to a desired gap value (of 20 nm, for example), i.e., the reference level Vref, in the group of gap detection signal level data that has been obtained by data logging and is now stored in the memory 34. A specific method of finding such a level will be described later. Then, the CPU 30 outputs the digital data 36 thus obtained, which represents the gap detection signal level corresponding to the desired gap value, to a D/A converter 35. As a result, a reference voltage 21 for gap control is applied to the amplifier/phase compensator 22.

Hereinafter, a method for defining the reference level Vref and a gap control method will be described.

Figure 2:
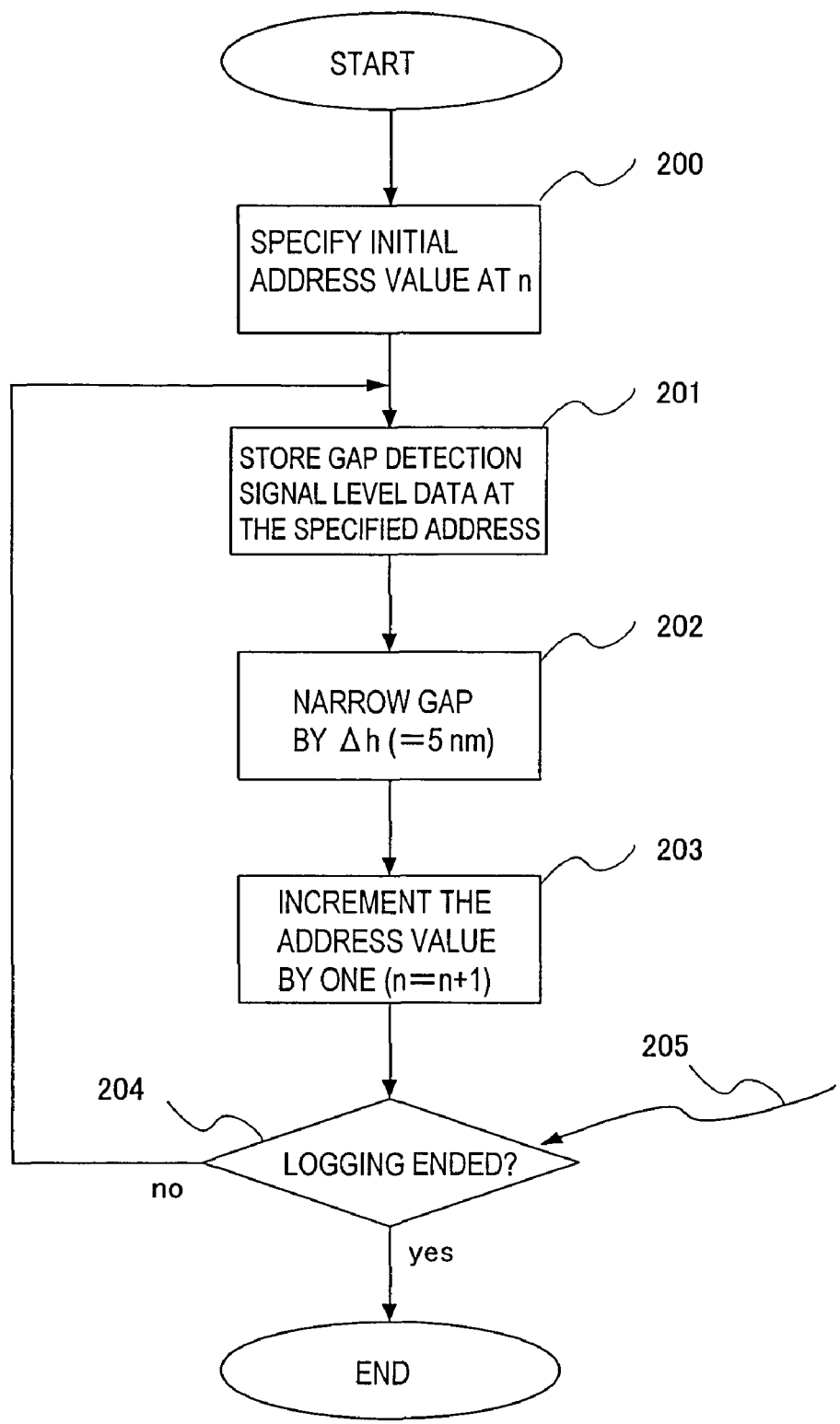
FIG. 2 is a flowchart showing how the processor works in a preferred embodiment of the present invention.

Now look at FIG. 2, which is a flowchart showing how to perform the data logging process to sequentially obtain the gap detection signal level data with the gap varied by Δh (=5 nm) each time.

First of all, in Step 200 shown in FIG. 2, the CPU 30 specifies the start address at which the gap detection signal level data 33 starts to be stored in the memory 34.

Next, in Step 201, the gap detection signal level data 33 that has been obtained with the current gap value is stored at the specified address in the memory 34. Then, in Step 202, the magnitude of the gap is reduced by Δh (=5 nm). That is to say, a rotation instruction pulse 28 to have the stepping motor 27 make one turn is generated. Subsequently, in Step 203, the address value at which the gap detection signal level data 33 is stored in the memory 34 is incremented by one (i.e., n=n+1).

Finally, in Step 204, it is determined whether or not this logging process should be finished. If the answer is NO, the process goes back to the processing step 201 to perform the same series of processing step 201 through 204 all over again. The decision of the processing step 204 is made based on an interrupt flag 205 to be generated during the processing that needs to be carried out by the CPU 30 in parallel with the logging process shown in FIG. 2. On the other hand, if the answer to the query of Step 204 is YES, then the logging process ends.

By performing such data logging, multiple gap detection signal level data 33 associated with a number of discrete gap values can be obtained. The multiple gap detection signal level data 33 correspond to the returning light intensity data associated with the respective gap values. That is why by performing the data logging, information about the dependence of the returning light intensity level on the gap value can be collected. Nevertheless, an exact gap value (i.e., absolute value) does not have to be obtained in this preferred embodiment. But the object of the data logging can be achieved sufficiently if it can be known how the returning light intensity changes according to the magnitude of the gap that varies at regular intervals.

Figure 3:
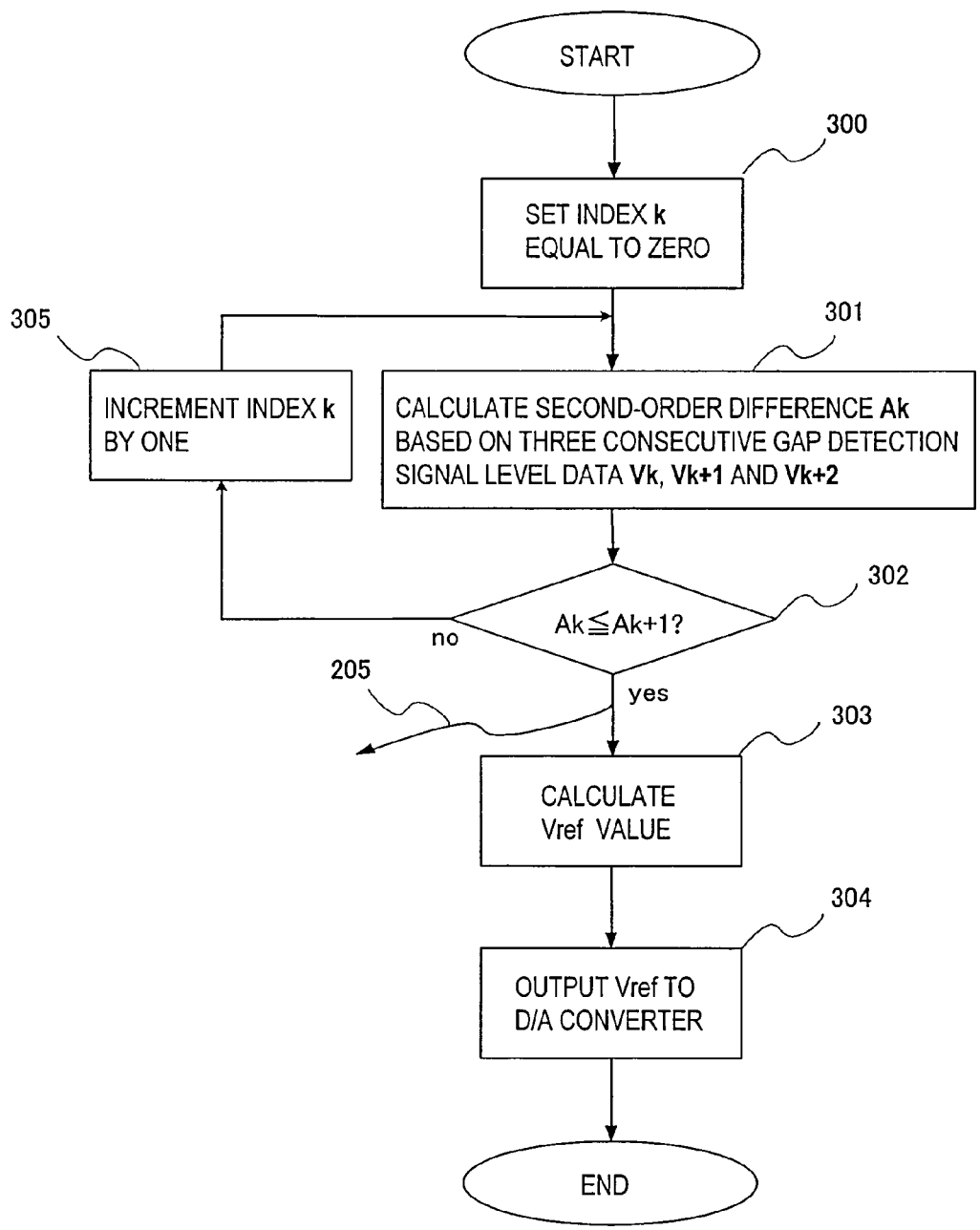
FIG. 3 is a flowchart showing how the processor works in a preferred embodiment of the present invention.

Hereinafter, it will be described with reference to FIG. 3 how the CPU 30 determines an extreme value for the second-order difference. FIG. 3 is a flowchart showing the procedure of determining an extreme value for the second-order difference based on the logged data.

First, in Step 300 shown in FIG. 3, the index k is set to be zero. In this case, the index k specifies a piece of gap detection signal level data 33 among the group of gap detection signal level data that are stored in the memory 34. The gap detection signal level data 33 specified by this index k will be identified by "Vk". If the index k is equal to zero, Vk, i.e., V0, represents the gap detection signal level data 33 that is stored at the start address of the memory 34 in the data logging process described above. In the following description, the respective gap detection signal level data 33 will be distinguished from each other by their index k and will be collectively identified by "Vk".

In the data logging process shown in FIG. 2, Vk when the index k is i+1 (where i is an integer that is equal to or greater than one), i.e., Vi+1, represents the gap detection signal level data 33 obtained by narrowing the gap by Δh compared to Vk. That is to say, speaking more generally, Vk represents the gap detection signal level data 33 obtained by narrowing the gap associated with the V0 data by (Δh×k).

Next, in Step 301, among the group of gap detection signal level data 33 stored in the memory 34, three pieces of gap detection signal level data Vk, Vk+1 and Vk+2, of which the indices k are continuous with each other, are fed into the CPU 30, thereby calculating the second-order difference Ak associated with Δh by the following Equation (1):

$$Ak = \frac{1}{\Delta h}\left(\frac{Vk - Vk+1}{\Delta h} - \frac{Vk+1 - Vk+2}{\Delta h}\right) \quad (1)$$

The three gap detection signal level data Vk, Vk+1 and Vk+2 have been obtained by narrowing the gap stepwise Δh by Δh in this order. As described above, the second-order difference Ak given by Equation (1) corresponds to the second-order differential value of a curve showing the relation between the gap and the returning light intensity level. That is why once the index k when the second-order difference Ak has an extreme value has been obtained, the returning light intensity level at the gap that does not depend on the reflectance of the optical disc can be known, and the reference level that needs to be known to realize a desired gap can be calculated.

Next, in Step 302, the magnitudes of the second-order differences Ak and Ak+1 of the indices k and k+1 are compared to each other. If the second-order difference Ak+1 is equal to or greater than the second-order difference Ak, then the second-order difference Ak gives an extreme value (i.e., a local minimum) of the second-order difference characteristic of the gap detection signal level data Vk that have been logged every time the gap is narrowed stepwise by Δh (=5 nm).

If the answer to the query of Step 302 is YES, then the result of this decision is passed as the interrupt flag 205 to the processing step 204 shown in FIG. 2 and the process advances to Step 303. In Step 303, supposing Vk that gives the extreme value for the second-order difference is identified by V, Vref is calculated by the following Equation (2):

$$Vref = V - C \times (Vf - V) \qquad (2)$$

where Vf is a value of the gap detection signal level data 33 when the gap is sufficiently large and C is a constant of proportionality. Vf is obtained by a different data logging process from the ones shown in FIGS. 2 and 3 and may be stored at an appropriate address in the memory 34.

The Equation (2) may be modified into the following Equation (3):

$$C = (V - Vref)/(Vf - V) \qquad (3)$$

The results of experiments carried out by the present inventors revealed that unless the difference between the gap values associated with V and Vref is too big, the ratio of (V−Vref) to (Vf−V) becomes constant irrespective of the reflectance of the optical disc. As that ratio is approximately 0.1 in this preferred embodiment, the constant of proportionality is set to be 0.1.

If the answer to the query of Step 302 is NO, then the process advances to Step 305, in which the index k is incremented by one and then the processing steps 301 and 302 are carried out all over again.

Next, in Step 304, the CPU 30 outputs the digital data 36 associated with Vref to the D/A converter 35. In response, the D/A converter 35 converts this digital data 36 into an analog signal and then supplies the signal as a reference voltage 21 for gap control to the amplifier/phase compensator 22.

With the reference voltage 21 supplied from the D/A converter 35, even if the given optical disc 10 has a different reflectance and exhibits a different characteristic between the gap and the reflected light intensity level from the previous ones, a desired gap can still be achieved. Hereinafter, this point will be described in detail.

Figure 6:
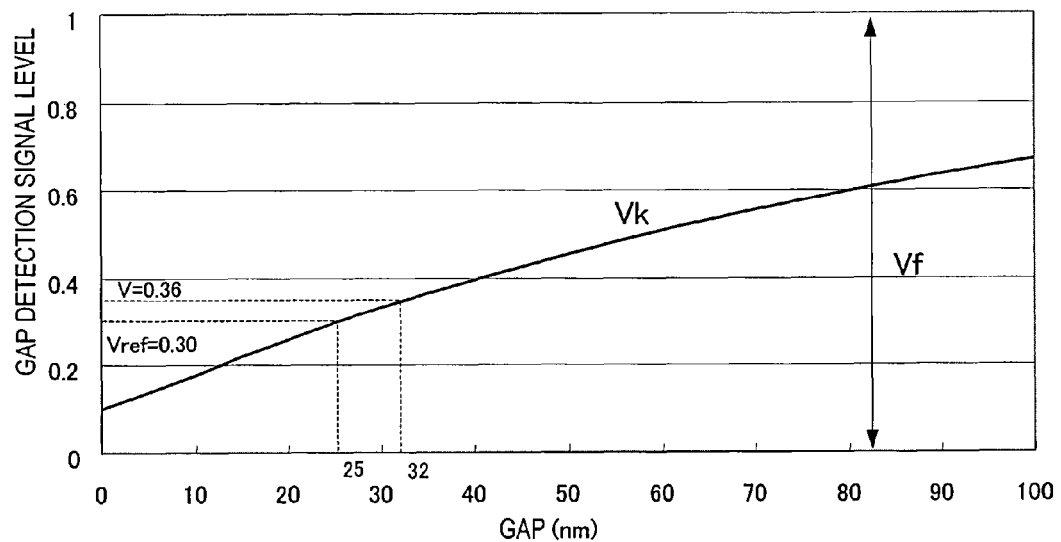
FIG. 6 is a graph showing how the gap detection signal level changes with the gap in a situation where the reflectance is 10%.
Figure 7:
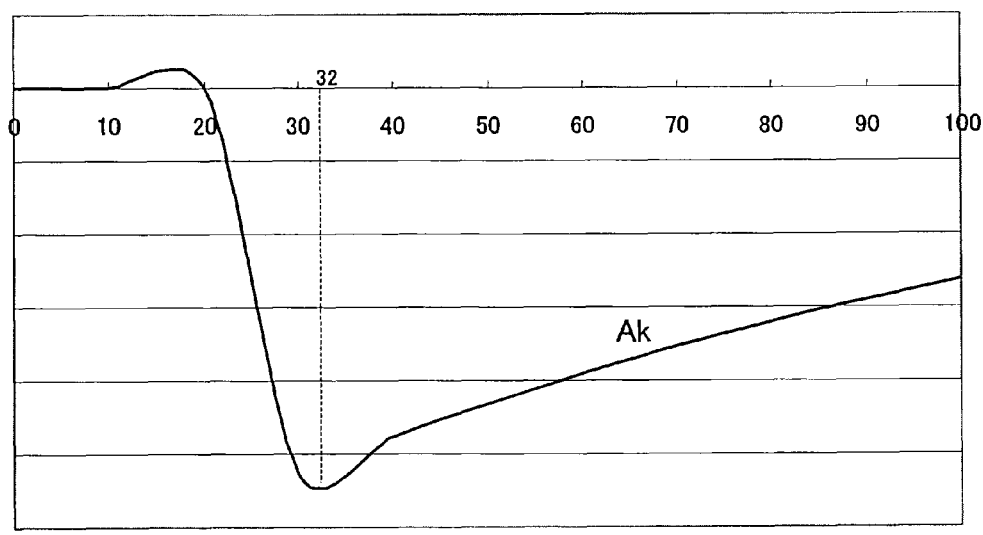
FIG. 7 is a graph showing the second-order difference characteristic of the curve shown in FIG. 6.

FIG. 6 is a graph showing the relation between the gap detection signal level data Vk, obtained by performing data logging on an optical disc 10 with a reflectance of 10%, and the gap. In the actual data logging process, however, a relation between the gaps varying at regular intervals and the gap detection signal levels (representing the returning light intensity levels) at those gaps is obtained, and therefore, a continuous curve such as the one shown in FIG. 6 cannot be obtained directly. The curve shown in FIG. 6 is obtained by performing some fitting (or approximation) such as a minimum square method on the data collected by the data logging. In the actual operation, such fitting does not always have to be performed. In FIG. 6, however, such a continuous curve is shown for the sake of clarity. The same statement will apply to FIG. 8 to be referred to later. In FIG. 6, the ordinate represents the gap detection signal level, which is represented as a ratio to a gap detection signal level when the gap is sufficiently large that is supposed to be one, while the abscissa represents the gap. FIG. 7 is a graph showing the second-order difference Ak of the gap detection signal level data Vk shown in FIG. 6.

In the example shown in FIGS. 6 and 7, the gap that results in a local minimum of the second-order difference Ak is 32 nm. The gap detection signal level data V associated with such a gap value of 32 nm that results in a local minimum of the second-order difference Ak is 0.36 as shown in FIG. 6.

Figure 8:
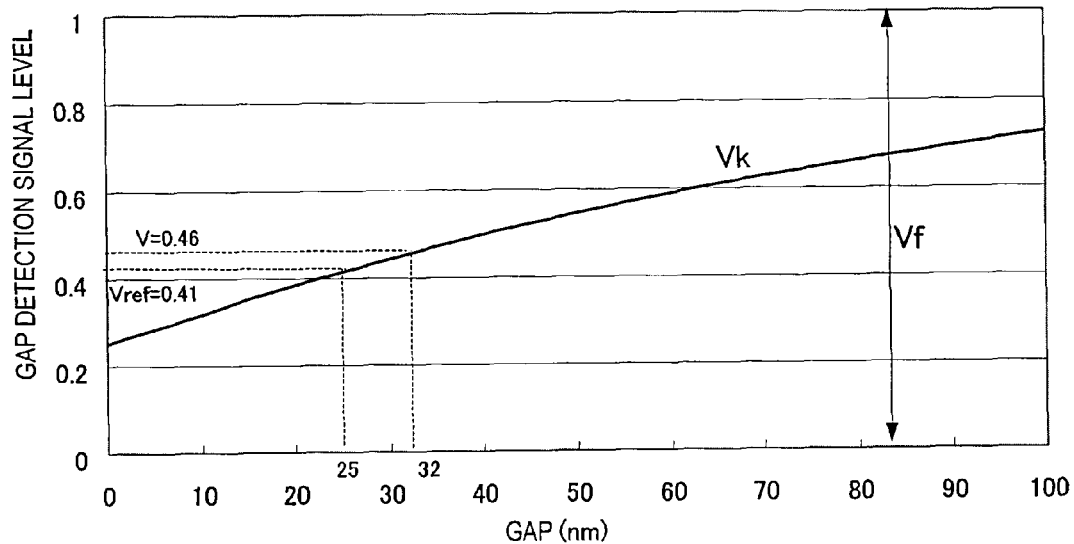
FIG. 8 is a graph showing how the gap detection signal level changes with the gap in a situation where the reflectance is 25%.
Figure 9:
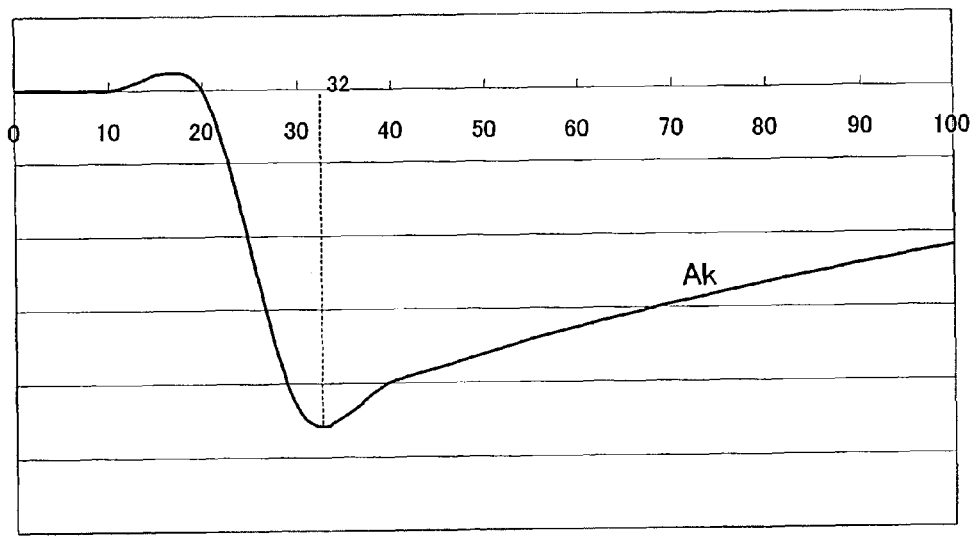
FIG. 9 is a graph showing the second-order difference characteristic of the curve shown in FIG. 8.

On the other hand, FIG. 8 is a graph showing the relation between the gap detection signal level data Vk, obtained by performing data logging on an optical disc 10 with a reflectance of 25%, and the gap. In FIG. 8, the ordinate represents the gap detection signal level, which is represented as a ratio to a gap detection signal level when the gap is sufficiently large that is supposed to be one, while the abscissa represents the gap. FIG. 9 is a graph showing the second-order difference Ak of the gap detection signal level data Vk shown in FIG. 8. The gap that results in a local minimum of the second-order difference Ak is 32 nm. The gap detection signal level data V associated with such a gap value of 32 nm that results in a local minimum of the second-order difference Ak is 0.46 as shown in FIG. 8.

If the Vref value that should be used in gap control is calculated by Equation (2), Vref=0.30 as for an optical disc with a reflectance of 10% but Vref=0.41 as for an optical disc with a reflectance of 25%.

According to the characteristic shown in FIG. 6, a gap detection signal level of 0.30 is associated with a gap of 25 nm. On the other hand, according to the characteristic shown in FIG. 8, a gap detection signal level of 0.41 is associated with a gap of 25 nm. Consequently, as for an optical disc with a reflectance of 10%, if the Vref value that needs to be used for gap control is set to be 0.30, then the resultant gap will be 25 nm. Meanwhile, as for an optical disc with a reflectance of 25%, the gap becomes equal to 25 nm when the Vref value that needs to be used for gap control is set to be 0.41.

As can be seen easily from the foregoing description, if the reference voltage Vref is determined by the method that has been described about a preferred embodiment of the present invention, the gap can be kept constant even if the reflectance of the given optical disc is different from the previous one. Thus, according to a preferred embodiment of the present invention, a reference level (i.e., the reference voltage) that should be set to achieve a desired gap by the gap control process can be determined even without detecting a gap detection signal level associated with the desired gap in advance.

In the preferred embodiments described above, the optical disc is supposed to have a reflectance of 10% or 25%. Even if the optical disc has a different reflectance, however, the gap control to keep the gap constant can also be performed by the same method. Optionally, the target gap value may also be defined other than 25 nm by adjusting the reference level Vref for gap control. In that case, the values of the constant C in Equations (2) and (3) need to be changed so as to achieve the desired gap. If the values of the constant C are changed, then a different Vref value will be calculated and the associated gap will be adjusted.

In the graphs shown in FIGS. 6 through 9, the abscissa represents the gap. To obtain an extreme value of the second-order difference Ak of the gap detection signal level data Vk with respect to Δh, however, there is no need to calculate the absolute value of the gap. Also, in these graphs, the gap detection signal level data Vk or its second-order difference Ak is plotted until the gap converges to zero. Optionally, the data logging process may be stopped as soon as the extreme value of the second-order difference Ak is found. That is why once the extreme value has been detected, there is no need to log the gap detection signal level data Vk or calculate the second-order difference Ak.

In the preferred embodiments described above, the CPU functions as the second-order difference calculating means.

However, the second-order difference calculating means may be implemented either by hardware only or as a combination of hardware and software. Also, the step to vary the gap in the data logging process does not have to be 5 nm and needs not be even a constant value, either, as long as appropriate correction or interpolation process is carried out.

A gap controller according to the present invention can set a reference level (i.e., a reference voltage) reasonably for a gap control that needs to be performed to keep the gap between the SIL and the optical disc constant, and therefore, can be used effectively in an optical disc drive for reading and/or writing a signal from/on an optical information storage medium using near-field light.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-301737 filed on Nov. 21, 2007 and No. 2008-275676 filed on Oct. 27, 2008, the entire contents of which are hereby incorporated by reference.

What is claimed is:

1. A gap controller for use in an optical information processor with an optical system that includes a solid immersion lens and that produces near-field light to be incident on an optical information storage medium, the controller comprising:
  a moving section for moving at least one of the solid immersion lens and the optical information storage medium so as to vary the gap between the solid immersion lens and the optical information storage medium;
  a gap detecting section for outputting a gap detection signal representing the magnitude of the gap between the solid immersion lens and the optical information storage medium;
  a gap control system for controlling the position of the solid immersion lens such that the level of the gap detection signal is maintained at a reference level Vref; and
  second-order difference calculating means for calculating the second-order difference of the gap detection signal with respect to the gap by getting the gap varied by the moving section and by getting the levels of the gap detection signal that change with the varying gap,
  wherein the gap control system determines the reference level Vref based on the second-order difference.

2. The gap controller of claim 1, wherein the gap control system determines the reference level Vref based on the level of the gap detection signal when the second-order difference has an extreme value.

3. The gap controller of claim 2, wherein the reference level Vref is determined by $Vref=V-C\times(Vf-V)$, where V is a level of the gap detection signal when the second-order difference has the extreme value, Vf is a level of the gap detection signal when the gap corresponds to a sufficiently large value, and C is a constant of proportionality.

4. An optical information processor comprising:
  an optical system that includes a solid immersion lens and that produces near-field light to be incident on an optical information storage medium;
  a moving section for moving at least one of the solid immersion lens and the optical information storage medium so as to vary the gap between the solid immersion lens and the optical information storage medium;
  a gap detecting section for outputting a gap detection signal representing the magnitude of the gap between the solid immersion lens and the optical information storage medium;
  a gap control system for controlling the position of the solid immersion lens such that the level of the gap detection signal is maintained at a reference level Vref; and
  second-order difference calculating means for calculating the second-order difference of the gap detection signal with respect to the gap by getting the gap varied by the moving section and by getting the levels of the gap detection signal that change with the varying gap,
  wherein the gap control system determines the reference level Vref based on the second-order difference.

5. A method for driving an optical information processor with an optical system that includes a solid immersion lens and that produces near-field light to be incident on an optical information storage medium, the method comprising the steps of:
  varying the gap between the solid immersion lens and the optical information storage medium, thereby generating a gap detection signal that changes its levels with the varying gap;
  calculating the second-order difference of the gap detection signal with respect to the gap;
  determining a reference level Vref based on the second-order difference; and
  controlling the position of the solid immersion lens such that the level of the gap detection signal is maintained at the reference level Vref.

6. The method of claim 5, wherein the step of determining the reference level Vref includes determining the reference level Vref based on the level of the gap detection signal when the second-order difference has an extreme value.

* * * * *